United States Patent [19]

Shoshi et al.

[11] Patent Number: 5,998,013
[45] Date of Patent: Dec. 7, 1999

[54] ANTI-GLARE HARD COAT FILM AND PROCESS FOR PRODUCING THE FILM

[75] Inventors: Satoru Shoshi, Kasukabe; Shunpei Watanabe, Yono; Wataru Miyazaki, Tokyo, all of Japan

[73] Assignee: Lintec Corporation, Tokyo, Japan

[21] Appl. No.: 08/950,039

[22] Filed: Oct. 14, 1997

[30] Foreign Application Priority Data

Dec. 25, 1996 [JP] Japan ..................... 8-356192

[51] Int. Cl.$^6$ ....................................... B32B 5/16
[52] U.S. Cl. .................. 428/331; 428/336; 427/508; 427/520; 427/163.1; 427/165; 516/341; 106/287.34; 106/482
[58] Field of Search ..................... 427/508, 520, 427/163.1, 165; 516/34; 106/287.34, 482; 428/331, 336

[56] References Cited

U.S. PATENT DOCUMENTS

| | | |
|---|---|---|
| 4,765,729 | 8/1988 | Taniguchi ................. 351/163 |
| 5,387,463 | 2/1995 | Nakamura et al. .............. 428/327 |
| 5,518,818 | 5/1996 | Kidai et al. ............... 428/412 |
| 5,770,306 | 6/1998 | Suzuki et al. ............ 428/328 |

*Primary Examiner*—Shrive Beck
*Assistant Examiner*—Paul D. Strain
*Attorney, Agent, or Firm*—Frishauf, Holtz, Goodman, Langer & Chick, P.C.

[57] ABSTRACT

An anti-glare hard coat film having a hard coat layer which has a thickness of 0.5 to 20 $\mu$m and comprises a cured product of an ultraviolet-curing resin and agglomerates of colloidal silica particles formed with an amine compound can be obtained by coating a plastic film with a hard coat material which comprises 100 parts by weight of the ultraviolet-curing resin, 1 to 30 parts by weight as silica particles of a dispersion of colloidal silica particles, and 0.05 to 5 parts by weight of the amine compound, drying the hard coat material, and curing the dried hard coat material by irradiation of ultraviolet light. The anti-glare hard coat film has excellent surface hardness and anti-glare property and provides excellent visibility when the film is used for various types of displays.

20 Claims, No Drawings

5,998,013

ANTI-GLARE HARD COAT FILM AND PROCESS FOR PRODUCING THE FILM

FIELD OF THE INVENTION

The present invention relates to a novel anti-glare hard coat film and a process for producing the film. More particularly, the present invention relates to an anti-glare hard coat film which has excellent surface hardness and anti-glare property and provides excellent visibility when the film is used for various types of display, and a process for efficiently producing this film.

PRIOR ART OF THE INVENTION

When a display, such as a CRT or a liquid crystal display, is used, light from the outside is occasionally reflected by the surface of the display (so-called glare), and difficulty arises in watching images on the display. Particularly as flat panel displays recently have larger sizes, solving the above problem becomes more important.

To solve the above problem, various methods for preventing glare have been used for various types of display. In an example of such methods for preventing glare, roughness is formed on the surface of hard coat films used for polarizing plates in liquid crystal displays and protective hard coat films for various types of display. Anti-glare treatments of hard coat films can generally be classified as (1) methods in which roughness is formed on the surface of a hard coat film by a physical means during curing in the formation of a hard coat layer and (2) methods in which a filler is mixed into a hard coat material which is used for forming a hard coat layer.

Between these two types of methods, the latter method in which a filler is mixed into a hard coat material is mainly used, and silica particles are mainly used as the filler. Silica particles are used because the whiteness of the obtained hard coat film is low and dispersion is excellent when silica particles are mixed into a hard coat material.

However, most of conventionally used silica particles have an average diameter of 1.5 to 7 µm. Silica particles having an average diameter in this range have drawbacks, for example, in that visibility is insufficient for LCD (liquid crystal display) cells which are becoming very fine in recent years.

Method (1) described above in which the roughness is formed by a physical means during curing of a hard coat layer has drawbacks in that operation of forming roughness is complicated and that this method causes insufficient visibility similarly to method (2) described above.

SUMMARY OF THE INVENTION

Accordingly, the present invention has objects of providing an anti-glare hard coat film which has excellent surface hardness and anti-glare property and provides excellent visibility when the film is used for various types of display, and a process for efficiently producing this film.

Extensive studies were conducted by the present inventors to achieve the above objects, and based upon the fact that colloidal silica particles heretofore could not exhibit the anti-glare property because of excessively small particle diameters but can be brought into agglomerates with an amine compound and that the degree of agglomerization can easily be controlled by the type and the amount of the amine compound, it was found that a hard coat film having an excellent hardness of the surface and excellent well-balanced anti-glare property and visibility can be obtained when colloidal silica particles which are agglomerated with an amine compound to a suitable degree are comprised in a hard coat layer in a specific amount and that this hard coat film can efficiently be obtained by coating a plastic film with a hard coat material comprising an ultraviolet-curing resin, colloidal silica particles, and an amine compound in specific amounts to form a cured layer of a specific thickness, drying the hard coat material, and curing the dried hard coat material by irradiation of ultraviolet light. The present invention has been completed based on this knowledge.

Thus, the present invention provides:

(1) An anti-glare hard coat film comprising a plastic film and a hard coat layer which coats the plastic film, has a thickness of 0.5 to 20 µm, and comprises 100 parts by weight of a cured product of an ultraviolet-curing resin and 1 to 30 parts by weight of agglomerates of colloidal silica particles formed with an amine compound.

Preferable embodiments of the present invention include:

(2) An anti-glare hard coat film described in (1), wherein the amine compound is at least one compound selected from the group consisting of aliphatic amines, alicyclic amines, aromatic amines, and heterocyclic amines;

(3) An anti-glare hard coat film described in (2), wherein the amine compound is a secondary amine or a tertiary amine;

(4) An anti-glare hard coat film described in (3), wherein the amine compound is a heterocyclic secondary or tertiary amine having nitrogen atom as a hetero atom; and (5) An anti-glare hard coat film described in any of (1) to (4), wherein the agglomerates of colloidal silica particles formed with an amine compound have an average particle diameter of 0.3 to 30 µm.

Moreover, in accordance with the present invention, the anti-glare hard coat films described in (1) to (5) can be produced by a process which comprises coating the plastic film with a hard coat material which comprises (A) 100 parts by weight of the ultraviolet-curing resin, (B) 1 to 30 parts by weight as silica particles of a dispersion of colloidal silica particles, and (C) 0.05 to 5 parts by weight of the amine compound in an amount which provides a cured hard coat layer having a thickness of 0.5 to 20 µm, drying the hard coat material, and curing the dried hard coat material by irradiation of ultraviolet light.

DETAILED DESCRIPTION OF THE INVENTION

The plastic film used as the base film in the anti-glare hard coat film of the present invention is not particularly limited, and a suitable plastic film can be selected from conventional plastic films which are used as the base film in optical hard coat films. Examples of the plastic film include films of polyesters, such as polyethylene terephthalate, polybutylene terephthalate, and polyethylene naphthalate, polyethylene film, polypropylene film, cellophane, diacetylcellulose film, triacetylcellulose film, acetylcellulose butyrate film, polyvinyl chloride film, polyvinylidene chloride film, polyvinyl alcohol film, ethylene-vinyl acetate copolymer film, polystyrene film, polycarbonate film, polymethylpentene film, polysulfone film, polyether ether ketone film, polyether sulfone film, polyether imide film, polyimide film, fluororesin film, nylon film, and acrylic resin film.

The thickness of the plastic film is not particularly limited and suitably selected in accordance with necessity. The thickness is generally in the range of 25 to 500 µm, preferably in the range of 50 to 250 µm. The surface of the plastic film may be treated, where desirable, to increase adhesion of the surface with a hard coat layer which is formed on the surface. Examples of such a treatment include formation of roughness on the surface by sand blasting or with a solvent, and oxidation of the surface by corona discharge, treatment by chromic acid, treatment by flame, treatment by heated air, or irradiation of ultraviolet light in the presence of ozone.

The anti-glare hard coat film of the present invention comprises the plastic film and a hard coat layer coating the plastic film. The hard coat layer comprises a cured product of an ultraviolet-curing resin and agglomerates of colloidal silica particles which are formed with an amine compound and uniformly dispersed in the cured product.

The ultraviolet-curing resin is not particularly limited, and a suitable resin can be selected from conventional ultraviolet-curing resins. The ultraviolet-curing resin contains a photopolymerizable prepolymer as the basic component and, optionally, a photopolymerizable monomer and a photopolymerization initiator. Examples of the photopolymerizable prepolymer include photopolymerizable prepolymers of polyester acrylates, epoxyacrylates, urethane acrylates, and polyol acrylates. The photopolymerizable prepolymer of a polyester acrylate can be obtained, for example, by condensation of a polyfunctional carboxylic acid and a polyhydric alcohol to obtain a polyester oligomer having hydroxyl groups at the ends, followed by esterification of the hydroxyl groups in the obtained oligomer with (meth)acrylic acid; or by addition of an alkylene oxide to a polyfunctional carboxylic acid to obtain an oligomer having hydroxyl groups at the ends, followed by esterification of the hydroxyl groups of the obtained oligomer with (meth)acrylic acid. The photopolymerizable prepolymer of epoxyacrylate can be obtained, for example, by esterification of oxirane rings in an epoxy resin of a bisphenol type or a novolak type having a relatively low molecular weight by the reaction with (meth)acrylic acid. The photopolymerizable prepolymer of urethane acrylate can be obtained, for example, by the reaction of a polyether polyol or a polyester polyol with a polyisocyanate to obtain a polyurethane oligomer, followed by esterification of the obtained oligomer with (meth) acrylic acid. The photopolymerizable prepolymer of polyol acrylate can be obtained, for example, by esterification of hydroxyl groups in a polyether polyol with (meth)acrylic acid. The photopolymerizable prepolymer may be used singly or as a combination of two or more types.

Examples of the photopolymerizable monomer include 1,4-butanediol di(meth)acrylate, 1,6-hexanediol di(meth) acrylate, neopentyl glycol di(meth)acrylate, polyethylene glycol di(meth)acrylate, neopentyl glycol adipate di(meth) acrylate, neopentyl glycol hydroxypivalate di(meth) acrylate, dicyclopentanyl di(meth)acrylate, dicyclopentenyl di(meth)acrylate modified with caprolactone, di(meth) acrylate of phosphoric acid modified with ethylene oxide, cyclohexyl di(meth)acrylate substituted with an allyl group, isocyanurate di(meth)acrylate, trimethylolpropane tri(meth) acrylate, dipentaerythritol tri(meth)acrylate, dipentaerythritol tri(meth)acrylate modified with propionic acid, pentaerythritol tri(meth)acrylate, trimethylolpropane tri(meth) acrylate modified with propylene oxide, tris(acryloxyethyl) isocyanurate, dipentaerythritol penta(meth)acrylate modified with propionic acid, dipentaerythritol hexa(meth) acrylate, and dipentaerythritol hexa(meth)acrylate modified with caprolactone. The photopolymerizable monomer may be used singly or as a combination of two or more types. The amount is selected generally in the range of 0 to 40 parts by weight, preferably in the range of 4 to 20 parts by weight, per 100 parts by weight of the above photopolymerizable prepolymer.

Examples of the photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholino-propane-1-one, 4-(2-hydroxyethoxy)phenyl 2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, and p-dimethylamine benzoate. The photopolymerization initiator may be used singly or as a combination of two or more types. The amount is generally selected in the range of 0.2 to 10 parts by weight per 100 parts by weight of the photopolymerizable prepolymer.

The silica particles which are used in the hard coat layer of the anti-glare hard coat film of the present invention are agglomerates of colloidal silica particles formed with an amine compound and preferably have an average diameter in the range of 0.3 to 30 μm. When the average particle diameter is less than 0.3 μm, there is the possibility that the anti-glare property is not sufficiently exhibited. When the average particle diameter exceeds 30 μm, the surface of the hard coat film becomes rough, and visibility tends to be decreased. For achieving excellent well-balanced anti-glare property and visibility, the average particle diameter is particularly preferably in the range of 0.5 to 10 μm.

Generally in colloidal silica particles, silica particles are uniformly dispersed as a colloid in water or in a hydrophilic solvent such as an alcohol. However, because it is not preferable that a material containing water is used for preparation of a hard coat material from the standpoint of compatibility, a dispersion in a hydrophilic organic solvent, such as an alcohol, is preferably used in the present invention. The average diameter of the colloidal silica particles before the agglomerization is generally in the range of 10 to 20 μm.

The amine compound used for forming the agglomerates of colloidal silica particles is not particularly limited, and a suitable compound can be selected from aliphatic amines, alicyclic amines, aromatic amines, and heterocyclic amines. The number of nitrogen atoms in the amine compound is not particularly limited, either. Among these amine compounds, secondary amines and tertiary amines are preferable because the storage stability of the hard coat material is good and a suitable degree and rate of agglomerization of colloidal silica particles are obtained. Heterocyclic secondary and tertiary amines having a nitrogen atom as the hetero atom are particularly preferable. Examples of the heterocyclic secondary and tertiary amines include 1,8-diazabicylco[5.4.0] undeca-7-ene (DBU), 1,4-diazabicyclo[2.2.2]octane (DABCO). 1.5-diazabicyclo[4.3.0]nona-5-ene (DBN), 7-methyl-1,5,7-triazabicyclo[4.4.0]dece-5-ene (MTBD), pyridine, 4-dimethylaminopyridine, pyrrolidine, piperidine, piperadine, pipecoline, and hindered amine compounds. Specific examples of the hindered amine compounds include bis(2,2,6,6-tetramethyl-4-piperidiyl) sebacate (for example, SANOL LS-770; a trade name; a product of SANKYO Co., Ltd.), 4-benzoyloxy-2,2,6,6-tetramethylpiperidine (for example, SANOL LS-744, a trade name, a product of SANKYO Co., Ltd.), bis(1,2,2,6,6-pentamethyl-4-piperidyl) sebacate (for example, TINUVIN 292, a trade name, a product of CIBA GEIGY Co.), tetrakis(2,2,6.6- tetramethyl-4-piperidyl) 1,2,3,4-butanetetracarboxylate (ADK STAB LA-57, a trade name, a product of ASAHI DENKA KOGYO K. K.), a condensate of 1,2,3,4-butanetetracarboxylic acid, 1,2,2,6,6-pentamethyl-4-piperidinol, and tridecyl alcohol (ADK STAB LA-62,a trade name, a product of ASAHI DENKA KOGYO K. K.), a condensate of 1,2,3,4-butanetetracarboxylic acid, 2,2,6,6-tetramethyl-4-piperidinol, and tridecyl alcohol (ADACASTAB LA-67,a trade name, a product of ASAHI DENKA KOGYO K. K.), a condensate of 1,2,3,4-butanetetracarboxylic acid, 1,2,2,6,6-pentamethyl-4-piperidinol, and β,β,β',β'-tetramethyl-3,9-(2,4,8,10-tetraoxaspiro[5,5]-undecane)diethanol (ADK STAB LA-63P, a trade name, a product of ASAHI DENKA KOGYO K. K.), a condensate of 1,2,3,4-butanetetracarboxylic acid, 2,2,6,6-tetramethyl-4-piperidinol, and , tetramethyl-3,9-(2,4,8,10-tetraoxaspiro[5,5]undecane)diethanol (ADK STAB LA-68LD, a trade name, a product of ASAHI DENKA KOGYO K. K.), (1,2,2,6,6-pentamethyl-4-piperidyl) methacrylate (ADK STAB LA-82, a trade name, a product of ASAHI DENKA KOGYO K. K.), (2,2,6,6-tetramethyl-4-piperidyl) methacrylate (ADK STAB LA-87, a trade name, a product of ASAHI DENKA KOGYO K. K.), CHIMASSORB 944LD (a trade name, a product of CIBA GEIGY Co.), TINUVIN 622LD (a trade name, a product of CIBA GEIGY Co.), TINUVIN 144 (a trade name, a product of CIBA GEIGY Co.), and GOODRITE UV-3034 (a trade name, a product of GOODRICH Co.). These hindered amine compounds are used as light stabilizers for various types of plastics.

As the amine compound other than those described above, aliphatic, alicyclic, and aromatic tertiary amines, such as trimethylamine, triethylamine, tripropylamine, tributylamine, tripentylamine, trihexylamine, dimethylcyclohexylamine, dimethylbenzylamine, and triphenylamine, can preferably be used.

Among these amine compounds, the hindered amine compounds provide a hard coat layer having a good weatherability because these compounds work also as light stabilizers and are advantageous also in this respect. Primary amines may be used. However, a primary amine must be used with care because storage stability of the hard coat material is occasionally decreased.

The amine compound may be used singly or as a combination of two or more types. The formation of agglomerates of colloidal silica particles with an amine compound can be conducted by uniformly mixing an ultraviolet-curing resin, a dispersion of colloidal silica particles, an amine compound, and a solvent in specific amounts in the preparation of a hard coat material, as described later.

In the hard coat layer of the anti-glare hard coat film of the present invention, it is necessary that the amount of the agglomerates of colloidal silica particles formed with an amine compound be in the range of 1 to 30 parts by weight per 100 parts by weight of the cured product of the ultraviolet-curing resin. When this amount is less than 1 part by weight, the anti-glare property is not sufficiently exhibited, and the objects of the present invention are not achieved. When this amount exceeds 30 parts by weight, light transmission is decreased. For achieving excellent well-balanced anti-glare property and light transmission, the amount is preferably in the range of 3 to 15 parts by weight per 100 parts by weight of the cured product of the ultraviolet-curing resin.

In the anti-glare hard coat film of the present invention, the thickness of the hard coat layer is selected in the range of 0.5 to 20 μm. When the thickness is less than 0.5 μm, there is the possibility that scratch resistance of the hard coat film is not sufficiently exhibited. When the thickness is 20 μm, scratch resistance is sufficiently high, and a still higher scratch resistance is not necessary. The thickness exceeding 20 μm is economically disadvantageous. From the standpoint of scratch resistance and economy, the thickness of the hard coat layer is preferably 1 to 15 μm, more preferably 2 to 10 μm.

The hardness of the hard coat layer is preferably H or higher in terms of the pencil hardness. When a hard coat layer has a hardness of H or higher, the hard coat layer has sufficient scratch resistance. For having still more sufficient scratch resistance, it is preferable that the hardness is 2H or higher. The method of measurement of the pencil hardness is described later.

The three-dimensional roughness Ra (the average roughness along the center line) of this hard coat layer is generally in the range of 0.05 to 0.5 μm. The method of measurement of Ra is described later.

The anti-glare hard coat film of the present invention generally has a total light transmittance of 80 to 93%, a haze of 2 to 40%, a 60° gloss of 15 to 130%, and a clarity of vision through of 30 to 350. Among these optical properties, the haze and the gloss are indices for the anti-glare property. The lower the gloss, the better the anti-glare property. An excessively high haze causes inferior light transmission. The clarity of vision through is an index for the visibility. The larger the clarity of vision through, the better the visibility. Therefore, for achieving excellent well-balanced light transmission, anti-glare property, and visibility, it is preferable that the haze is in the range of 3 to 30%, the gloss is in the range of 40 to 100%, and the clarity of vision through is in the range of 50 to 250. The methods of measurements of these optical properties are described later.

The process for producing the anti-glare hard coat film of the present invention is described in the following.

A hard coat material used for forming a hard coat layer is prepared first. The hard coat material is prepared by uniformly mixing an ultraviolet-curing resin of component (A), a dispersion of colloidal silica particles of component (B), and an amine compound of component (C) in a suitable solvent to form the colloidal silica particles into agglomerates of particles having an average diameter of preferably about 0.3 to 30 μm, more preferably about 0.5 to 10 μm, with the amine compound. In the preparation, the dispersion of colloidal silica particles of component (B) is used in an amount as silica particles of 1 to 30 parts by weight, preferably 3 to 15 parts by weight, per 100 parts by weight of the ultraviolet-curing resin of component (A). The amine compound of component (C) is used in an amount of 0.05 to 5 parts by weight per 100 parts by weight of the ultraviolet-curing resin. When the amount of the colloidal silica particles is less than 1 part by weight, the anti-glare property of the obtained hard coat film is not sufficiently exhibited, as described above. When the amount of the colloidal silica particles exceeds 30 parts by weight, light transmission is decreased, also as described above. When the amount of the amine compound is less than 0.05 parts by weight, the effect of the amine compound to form agglomerates of the colloidal silica particles is not sufficiently exhibited, and the objects of the present invention are not achieved. When the amount of the amine compound exceeds 5 parts by weight, the colloidal silica particles are excessively agglomerated, and the obtained hard coat film shows insufficient visibility. For forming agglomerates of the colloidal silica of a suitable degree and achieving excellent well-balanced anti-glare property and visibility of the obtained hard coat film, the amount of the amine compound is preferably in the range of 0.1 to 2 parts by weight per 100 parts by weight of the ultraviolet-curing resin. By varying the amount of the colloidal silica particles and the type and the amount of the amine compound, the anti-glare property and the visibility of the obtained hard coat film can easily be controlled.

Examples of the above solvent include n-propyl alcohol, isopropyl alcohol, n-butyl alcohol, sec-butyl alcohol, pentyl alcohol, ethylcellosolve, benzene, toluene, xylene, ethylbenzene, cyclohexane, ethylcyclohexane, ethyl acetate, butyl acetate, methyl ethyl ketone, methyl isobutyl ketone, cyclohexanone, and tetrahydrofuran. The solvent may be used singly or as a combination of two or more types.

In this preparation of the hard coat material, the order of mixing components is not particularly limited. For example, components (A), (B), and (C) may be added into a solvent and mixed together. In another example, colloidal silica particles are agglomerated in advance by adding an amine compound of component (C) to a dispersion of colloidal silica particles of component (B) to which a solvent may be added, where necessary, and the obtained agglomerates are mixed with an ultraviolet-curing resin of component (A) and, where necessary, a solvent. In still another example, a hard coat material containing colloidal silica particles in a high concentration is prepared in advance, and the obtained material is mixed with an ultraviolet-curing resin and a solvent, where necessary, to obtain a hard coat material having a desired concentration of the colloidal silica particles. Conventional additives, such as a defoaming agent and a leveling agent, may be added to the hard coat material in accordance with desire.

The concentration of the solid matter in the hard coat material is not particularly limited. From the standpoint of the coating property, the drying property, and economy, the concentration is preferably in the range of 10 to 70% by weight, more preferably 30 to 50% by weight.

The hard coat material prepared as described above is applied to a plastic film in such an amount that the cured hard coat layer has the thickness of 0.5 to 20 $\mu$m, preferably 1 to 15 $\mu$m, more preferably 2 to 10 $\mu$m, and then dried. The method of coating is not particularly limited and a conventional method, such as bar coating, knife coating, roll coating, blade coating, and die coating, can be used. The required amount of the hard coat material is calculated from the concentration of the solid matter in the used material and the density of the cured hard coat layer, and the thickness of the applied hard coat material can be controlled with reference to this amount.

In the present invention, the dried layer obtained above is cured by irradiation of ultraviolet light to form a hard coat layer. The apparatus for the irradiation is not particularly limited. For example, a conventional apparatus for irradiation of ultraviolet light using a high voltage mercury lamp, a xenone lamp, a metal halide lamp, or a fusion H lamp can be used. The amount of irradiation of ultraviolet light is generally about 100 to 500 mJ/cm$^2$.

The hard coat film thus obtained has excellent surface hardness and anti-glare property and shows excellent visibility when the hard coat film is used for various types of display. Therefore, the hard coat film can be used as a hard coat film for polarizing plate in liquid crystal displays and a protective film for various type of displays.

To summarize the advantages obtained by the invention, in the anti-glare hard coat film of the present invention, colloidal silica particles which have an excessively small size and heretofore could not be used for exhibiting the anti-glare property are formed into agglomerates with an amine compound to a suitable degree and comprised in a hard coat layer. The hard coat film thus obtained has excellent surface hardness and anti-glare property and shows excellent visibility when the hard coat film is used for various types of displays. The anti-glare property and the visibility can easily be controlled by changing the amount of the colloidal silica particles and the type and the amount of the amine compound.

The anti-glare hard coat film of the present invention has a smaller surface roughness, a larger clarity of vision through, and more excellent visibility in comparison with conventional hard coat films having the same haze and gloss.

The hard coat film of the present invention having the above characteristics can advantageously be used as a hard coat film for a polarizing plate in liquid crystal displays and a protective film for various type of displays.

EXAMPLES

The invention will be described in more detail with reference to the examples in the following. However, these examples are not to be construed to limit the scope of the invention.

The properties of a hard coat film were evaluated in accordance with the following methods.
(1) Total Light Transmittance and Haze
The total light transmittance and the haze were measured in accordance with the method of Japanese Industrial Standard K6714 using a haze meter produced by NIPPON DENSHOKU KOGYO Co., Ltd.
(2) 60° Gloss
The 60° gloss was measured in accordance with the method of Japanese Industrial Standard K7105 using a digital varied-angle optometer produced by SUGA SHIKENKI Co., Ltd.
(3) Clarity of Vision Through
The clarity of vision through was measured in accordance with the method of Japanese Industrial Standard K7105 using an apparatus for measurement of image formation produced by SUGA SHIKENKI Co., Ltd. The result is shown as the sum of measurements obtained by using four optical comb widths: 0.125 mm, 0.5 mm, 1.0 mm, and 2.0 mm.
(4) Pencil Hardness
The pencil hardness was measured by hand writing in accordance with the method of Japanese Industrial Standard K5400.
(5) Surface Roughness Ra
The surface roughness Ra was measured by using a surface roughness meter (type SAS-2010, a product of MEISHIN KOKI Co., Ltd.).

Example 1

To 100 parts by weight of an ultraviolet-curing resin (a product of DAINICHI SEIKA KOGYO Co., Ltd., SEIKA-BEAM EXF-01J, a polyester acrylate), 20 parts by weight of a dispersion of colloidal silica particles in isopropyl alcohol (a product of SHOKUBAI KASEI KOGYO Co., Ltd., OSCAL1432, concentration: 30% by weight, average particle diameter: 10 to 20 nm) and 0.2 parts by weight of 1,8-azabicyclo[5.4.0]undeca-7-ene (a product of KANTO KAGAKU Co., Ltd.) were added. To the obtained mixture, 50 parts by weight of isopropyl alcohol, 50 parts by weight of ethylcellosolve, and 50 parts by weight of methyl ethyl ketone were added and mixed well to prepare a hard coat material. The agglomerates of the colloidal silica particles formed with the amine had an average diameter of about 3 μm.

Then, a film of polyethylene terephthalate having a thickness of 125 μm (a product of TORAY Co., Ltd., LUMILAR T60) was coated with the above hard coat material in such an amount that the cured hard coat layer had a thickness of 4 μm, and the obtained product was dried at 80° C. for 1 minute. The dried layer was irradiated with ultraviolet light using an apparatus for irradiation of ultraviolet light (a product of AI GRAPHICS Co., Ltd., UB042-5AM-W) in an amount of 300 mJ/cm$^2$ to prepare a hard coat film by curing. The results of the evaluation of the obtained film are shown in Table 1.

Comparative Example 1

A hard coat film was prepared in accordance with the same procedures as those conducted in Example 1 except that 4 parts by weight of amorphous silica (a product of FUJI SILICIA KAGAKU Co., Ltd., SAIRISIA256, average particle diameter: about 3 μm) were used in place of 20 parts by weight of the dispersion of colloidal silica particles in isopropyl alcohol and that 1,8-diazabicyclo[5,4,0]undeca-7-ene was not used. The results of the evaluation of the obtained film are shown in Table 1

Example 2

To 100 parts by weight of the hard coat material prepared in Example 1, 40 parts by weight of an ultraviolet-curing resin (a product of DAINICHI SEIKA KOGYO Co., Ltd., SEIKABEAM EXF-01J, a polyester acrylate) and 60 parts by weight of isopropyl alcohol were added and mixed well to prepare a hard coat material. Then, a hard coat film was prepared in accordance with the same procedures as those conducted in Example 1. The results of the evaluation of the obtained film are shown in Table 1.

Comparative Example 2

A hard coat film was prepared in accordance with the same procedures as those conducted in Comparative Example 1 except that the amount of amorphous silica was changed to 2 parts by weight. The results of the evaluation of the obtained film are shown in Table 1.

Example 3

A hard coat film was prepared in accordance with the same procedures as those conducted in Example 1 except that triethylamine was used in place of 1,8-diazabicyclo[5,4,0]undeca-7-ene. The results of the evaluation of the obtained film are shown in Table 1. The agglomerates of the colloidal silica particles formed with the amine had an average diameter of about 5 μm.

Example 4

A hard coat film was prepared in accordance with the same procedures as those conducted in Example 1 except that bis(1,2,2,6,6-pentamethyl-4-piperidyl) sebacate (a product of CIBA GEIGY Co., trade name: TINUVIN 292) was used in place of 1,8-diazabicyclo[5,4,0]undeca-7-ene. The results of the evaluation of the obtained film are shown in Table 1. The agglomerates of the colloidal silica particles formed with the amine had an average diameter of about 1.5 μm.

TABLE 1

Properties of Hard Coat Film

| | total light transmittance (%) | haze (%) | 60° gloss | clarity of vision through | pencil hardness | Ra (μm) |
|---|---|---|---|---|---|---|
| Example 1 | 87.7 | 25.9 | 33.3 | 50.2 | 2H | 0.2708 |
| Comparative Example 1 | 87.6 | 28.1 | 27.5 | 25.8 | 2H | 0.3052 |
| Example 2 | 88.5 | 7.8 | 73.6 | 76.1 | 2H | 0.2881 |
| Comparative Example 2 | 88.7 | 7.5 | 80.4 | 51.6 | 2H | 0.3288 |
| Example 3 | 88.3 | 15.4 | 58.0 | 58.4 | 2H | 0.2921 |
| Example 4 | 89.0 | 13.6 | 60.2 | 206.1 | 2H | 0.1242 |

It is shown -by comparison of the results obtained in Examples 1 and 2 with those obtained in Comparative Examples 1 and 2, respectively, that much higher values of the clarity of vision through which is an index for the visibility were obtained in Examples while the haze and gloss which are indices for the anti-glare property were the same. It is also shown by the comparison of the results obtained in Examples 1, 3, and 4 with each other that a remarkably high value of clarity of vision through was obtained in Example 4 in which a hindered amine compound was used as the amine compound while the haze and the gloss are in the suitable ranges.

It is shown by the comparison of the results obtained in Example 4 and Comparative Example 2 that the hard coat film obtained in Example 4 had a remarkably higher clarity of vision through, i.e., an excellent visibility, while the haze was higher and the gloss was lower, i.e., the anti-glare property was more excellent, than those in Comparative Example 2.

What is claimed is:

1. An anti-glare hard coat film comprising a plastic film and a hard coat layer which coats the plastic film, the hard coat layer has a thickness of 0.5 to 20 μm, and comprises 100 parts by weight of a cured product of an ultraviolet-curing resin and 1 to 30 parts by weight of agglomerates of colloidal silica particles formed with an amine compound, the agglomerates of the colloidal silica particles having an average particle diameter of 0.3 to 30 μm.

2. An anti-glare hard coat film according to claim 1, wherein the amine compound is at least one compound selected from the group consisting of aliphatic amines, alicyclic amines, aromatic amines, and heterocyclic amines.

3. An anti-glare hard coat film according to claim 2, wherein the amine compound is a secondary amine or a tertiary amine.

4. An anti-glare hard coat film according to claim 3, wherein the amine compound is a heterocyclic secondary or tertiary amine having a nitrogen atom as a hetero atom.

5. A process for producing the anti-glare hard coat film described in claim 1, which process comprises coating the plastic film with a hard coat material which comprises (A) 100 parts by weight of the ultraviolet-curing resin, (B) 1 to 30 parts by weight as silica particles of a dispersion of colloidal silica particles, and (C) 0.05 to 5 parts by weight of the amine compound in an amount which agglomerates said colloidal silica particles and provides a cured hard coat layer having a thickness of 0.5 to 20 μm, drying the hard coat material, and curing the dried hard coat material by irradiation of ultraviolet light.

6. A process for producing the anti-glare hard coat film described in claim 2, which process comprises coating the plastic film with a hard coat material which comprises (A) 100 parts by weight of the ultraviolet-curing resin, (B) 1 to 30 parts by weight as silica particles of a dispersion of colloidal silica particles, and (C) 0.05 to 5 parts by weight of the amine compound in an amount which agglomerates said colloidal silica particles and provides a cured hard coat layer having a thickness of 0.5 to 20 μm, drying the hard coat material, and curing the dried hard coat material by irradiation of ultraviolet light.

7. A process for producing the anti-glare hard coat film described in claim 3, which process comprises coating the plastic film with a hard coat material which comprises (A) 100 parts by weight of the ultraviolet-curing resin, (B) 1 to 30 parts by weight as silica particles of a dispersion of colloidal silica particles, and (C) 0.05 to 5 parts by weight of the amine compound in an amount which agglomerates said colloidal silica particles and provides a cured hard coat layer having a thickness of 0.5 to 20 μm, drying the hard coat material, and curing the dried hard coat material by irradiation of ultraviolet light.

8. A process for producing the anti-glare hard coat film described in claim 4, which process comprises coating the plastic film with a hard coat material which comprises (A) 100 parts by weight of the ultraviolet-curing resin, (B) 1 to 30 parts by weight as silica particles of a dispersion of colloidal silica particles, and (C) 0.05 to 5 parts by weight of the amine compound in an amount which agglomerates said colloidal silica particles and provides a cured hard coat layer having a thickness of 0.5 to 20 μm, drying the hard coat material, and curing the dried hard coat material by irradiation of ultraviolet light.

9. An anti-glare hard coat film according to claim 1, wherein the agglomerates of the colloidal silica particles have an average diameter of 0.5 to 10 μm.

10. An anti-glare hard coat film according to claim 9, wherein the plastic film is selected from the group consisting of polyethylene terephthalate, polybutylene terephthalate, polyethylene naphthalate, polyethylene, polypropylene, cellophane, diacetylcellulose, triacetylcellulose, acetylcellulose butyrate, polyvinyl chloride, polyvinylidene chloride, polyvinyl alcohol, ethylene-vinyl acetate copolymer, polystyrene, polycarbonate, polymethylpentene, polysulfone, polyether ether ketone, polyether sulfone, polyether imide, polyimide, fluororesin, nylon and acrylic resin; said plastic film having a thickness of 25 to 500 μm.

11. An anti-glare hard coat film according to claim 10, wherein the ultraviolet curing resin comprises (i) a photopolymerizable prepolymer of a polyester acrylate, an epoxyacrylate, an urethane acrylate or a polyol acrylate and (ii) at least one photopolymerization initiator selected from the group consisting of benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholino-propane-1-one, 4-(2-hydroxyethoxy)phenyl 2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylamine benzoate; said photopolymerization initiator being in an amount of 0.2 to 10 parts by weight per 100 parts by weight of the photopolymerizable prepolymer.

12. An anti-glare hard coat film according to claim 11, wherein the ultraviolet curing resin further comprises at least one photopolymerizable monomer selected from the group consisting of 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicyclopentenyl di(meth)acrylate modified with caprolactone, di(meth)acrylate of phosphoric acid modified with ethylene oxide, cyclohexyl di(meth)acrylate substituted with an allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate, and dipentaerythritol hexa(meth)acrylate modified with caprolactone; said photopolymerizable monomer being in an amount of 4 to 20 parts by weight, per 100 parts by weight of the photopolymerizable prepolymer.

13. An anti-glare hard coat film according to claim 12, wherein the thickness of the hard coat layer is 1 to 15 μm and the agglomerates of the colloidal silica particles are in an amount of 3 to 15 parts by weight per 100 parts by weight of the cured product of the ultraviolet-curing resin.

14. An anti-glare hard coat film according to claim 13, wherein the amine compound is at least one compound selected from the group consisting of 1,8-diazabicyclo[5.4.0]undeca-7-ene; 1,4-diazabicyclo[2.2.2]octane; 1.5-diazabicyclo[4.3.0] nona-5-ene; 7-methyl-1,5,7-triazabicyclo[4.4.0] dece-5-ene; pyridine; 4-dimethylaminopyridine; pyrrolidine; piperidine; piperadine; pipecoline; bis(2,2,6,6-tetramethyl-4-piperidiyl) sebacate; 4-benzoyloxy-2,2,6,6-tetramethylpiperidine; bis (1,2,2,6,6-pentamethyl-4-piperidyl)sebacate; tetrakis(2,2,6, 6-tetramethyl-4-piperidyl)1,2,3,4-butanetetracarboxylate; a condensate of 1,2,3,4-butane-tetracarboxylic acid, 1,2,2,6, 6-pentamethyl-4-piperidinol and tridecyl alcohol; a condensate of 1,2,3,4-butanetetracarboxylic acid, 2,2,6,6-tetramethyl-4-piperidinol and tridecyl alcohol; a condensate of 1,2,3,4-butanetetracargoxylic acid, 1,2,2,6,6-pentamethyl-4-piperidinol and β,β,β',β'-tetramethyl-3,9-(2, 4,8,10-tetraoxaspiro[5,5]undecane)diethanol; a condensate of 1,2,3,4-butane-tetracarboxylic acid, 2,2,6,6-tetramethyl-4-piperidinol and β,β,β',β'-tetramethyl-3,9-(2,4,8,10-tetraoxaspiro[5,5]undecane)diethanol; (1,2,2,6,6-pentamethyl-4-piperidyl)methacrylate; (2,2,6,6-tetramethyl-4-piperidyl)methacrylate; trimethylamine; triethylamine; tripropylamine; tributylamine; tripentylamine; trihexylamine; dimethylcyclohexylamine; dimethylbenzylamine and triphenylamine.

15. An anti-glare hard coat film according to claim 14, wherein the thickness of the hard coat layer is 2 to 10 μm and the hardness of the hard coat layer is H or higher.

16., An anti-glare hard coat film according to claim 15, wherein the hardness is 2H or higher and the hard coat layer has a three-dimensional roughness, Ra, of 0.05 to 0.5 μm.

17. An anti-glare hard coat film according to claim 16, wherein the anti-glare hard coat film has a total light transmittance of 80 to 93%, a haze of 2 to 40%, a 60° gloss of 15 to 130% and a clarity of vision through of 30 to 350.

18. An anti-glare hard coat film according to claim 16, wherein-the haze is 3 to 30%, the gloss is 40 to 100% and the clarity of vision through is 50 to 250.

19. The process according to claim 5, wherein the amount of the agglomerates of the colloidal silica particles is 3 to 15 parts by weight; the agglomerates of the colloidal silica particles having an average diameter of 0.5 to 10 µm; and the amine compound is in an amount of 0.1 to 2 parts by weight.

20. The process according to claim 19, wherein the irradiation is in an amount of 100 to 500 mJ/cm$^2$.

* * * * *